(12) United States Patent
Goodnow

(10) Patent No.: US 8,797,199 B1
(45) Date of Patent: Aug. 5, 2014

(54) CONTINUOUS ADAPTIVE DIGITAL TO ANALOG CONTROL

(71) Applicant: Amazon Technologies, Inc., Reno, NV (US)

(72) Inventor: Christopher Alon Goodnow, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/895,734

(22) Filed: May 16, 2013

(51) Int. Cl.
 *H03M 1/00* (2006.01)

(52) U.S. Cl.
 USPC .............................................. 341/142; 700/29

(58) Field of Classification Search
 CPC ....... H03M 1/00; G05B 11/42; G05B 13/048; G05B 17/02; G05B 13/042; G05B 13/024
 USPC ......... 341/142; 700/42, 29, 30, 28, 31, 37, 44
 See application file for complete search history.

(56) References Cited

U.S. PATENT DOCUMENTS

| | | | |
|---|---|---|---|
| 5,153,807 | A | 10/1992 | Saito et al. |
| 5,159,547 | A | 10/1992 | Chand |
| 5,406,474 | A | 4/1995 | Hansen |
| 5,587,896 | A | 12/1996 | Hansen et al. |
| 6,055,524 | A | 4/2000 | Cheng |
| 7,138,781 | B2 | 11/2006 | Murray et al. |
| 7,706,899 | B2 | 4/2010 | El Rifai |
| 7,805,207 | B2 | 9/2010 | El Rifai |
| 8,185,217 | B2 * | 5/2012 | Thiele ............................. 700/29 |
| 2007/0021850 | A1 | 1/2007 | Wojsznis et al. |
| 2009/0248177 | A1 | 10/2009 | Rifai |
| 2009/0319060 | A1 | 12/2009 | Wojsznis et al. |

FOREIGN PATENT DOCUMENTS

EP 0610189 B1 8/1994

OTHER PUBLICATIONS

"Self-Tuning of PID Controllers by Adaptive Interaction" by Feng Lin, et al., Proceedings of the American Control Conference, Chicago, Illinois, Jun. 2000, pp. 1-6.
"Multiple Model and Neural based Adaptive Multi-loop PID Controller for a CSTR Process" by R.Vinodha, et. al., International Journal of Electrical and Computer Engineering 5:4 2010, pp. 251-256.

(Continued)

*Primary Examiner* — Joseph Lauture
(74) *Attorney, Agent, or Firm* — Robert C. Kowert; Meyertons, Hood, Kivlin, Kowert & Goetzel, P.C.

(57) ABSTRACT

Within a mechanical control system, continuous adaptive digital to analog control may control an analog actuated device by comparing a current value for a process variable to a setpoint value to obtain an error value, wherein the process variable may represent a monitored condition controlled by an analog actuated device. Continuous adaptive digital to analog control may also include converting the error value into a digital pulse time value representing a correction to compensate for the error value. The error value may be converted using a gain factor derived from timing characteristics for the actuated device. An analog value may be output based on a previously output value and the digital pulse time value. Continuous adaptive digital to analog control may repeatedly adjust the actuated device according to the changing values for the process variable.

20 Claims, 7 Drawing Sheets

(56) References Cited

OTHER PUBLICATIONS

"A new Adaptive PID Control Approach Based on Closed-Loop Response Recognition" by Martin Foltin, et. al., Jun. 2006, Proceedings of the 7th WSEAS International Conference on Automation and Information, Cavtat, Croatia, pp. 156-160.

"Nonlinearly Parameterized Adaptive PID Control for Parallel and Series Realization" by Khalid El Rifai, Mitsubishi Electric Research Laboratories, Jul. 2009, pp. 1-8.

"Optimization of a Control Loop Using Adaptive Method" by K.Prabhu, et. al., International Journal of Engineering and Innovative Technology, vol. 1, Issue 3, Mar. 2012, pp. 133-138.

\* cited by examiner

US 8,797,199 B1

CONTINUOUS ADAPTIVE DIGITAL TO ANALOG CONTROL

BACKGROUND

Proportional, integral and derivative (PID) controllers and other control loops are frequently used to monitor and control analog systems in mechanical control systems. PID controllers are generally designed to eliminate the need for continuous operator attention. For example, a home thermostat may be used to automatically hold the temperature at a set-point. In traditional PID loop control, various coefficients generally have to be configured and adapted to ensure efficient operation.

In general, the output of a PID controller may change in response to a change in a measured process variable of the system being controlled and the output of the PID controller may also change in response to a change in a setpoint or target value for the measured process variable. PID control loops frequently include three different modes. These modes are generally referred to as the proportional, the integral and the derivative. Each of these modes may have its own coefficient that must be configured properly for the PID control loop to function efficiently. Setting up and configuring the various coefficients of a PID control system may be referred to as "tuning" the PID control loop (or more generally, "PID tuning"). If not properly set up, changes in a setpoint or in the system load may result in excessive system oscillation or excessive error (e.g., between the setpoint and the measured process variable).

PID tuning frequently requires numerous monitoring and configuration steps performed by the technician or engineer tuning the system. For example, turning a traditional PID control system may involve: measuring the period of oscillation (e.g., the time of one complete control loop cycle), adjusting the proportional coefficient to obtain loop stability, calculating an interval coefficient to use, monitoring and evaluating the response of the control loop and adjusting the interval coefficient accordingly, determining any derivative coefficient needed, as well as testing the system by simulating sudden changes in system load to observe the response time to reach a new setpoint.

Additionally, PID loop algorithms may also require evaluating and adjusting initial constants and may include the added complexity of steady state error control as a supplemental algorithm in order to achieve control stability.

DETAILED DESCRIPTION OF EMBODIMENTS

Figure 1:
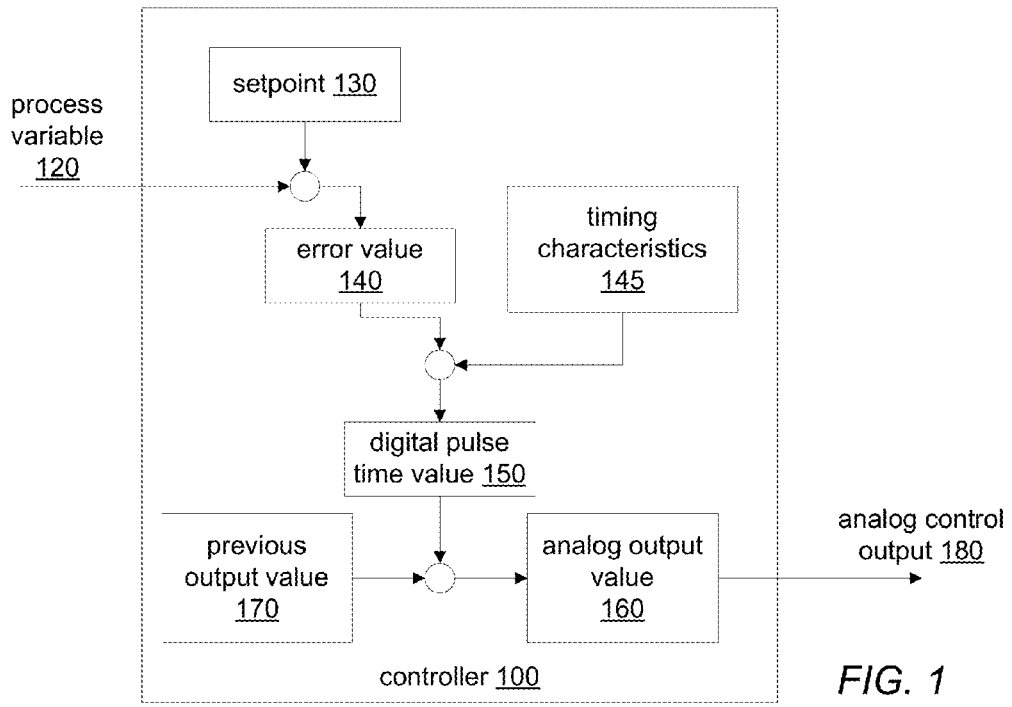
FIG. 1 is a logical block diagram illustrating one embodiment of continuous adaptive digital to analog control, as described herein.

As discussed in more detail below, systems and methods for continuous adaptive digital to analog control within mechanical control systems are provided. Continuous adaptive digital to analog control may, in some embodiments, be considered a digital to analog control system and may employ real-time compensation for changing conditions within a mechanical control system. In some embodiments, continuous adaptive digital to analog control may replace traditional PID loops within mechanical control systems and may not require tuning as do traditional PID control loops.

A controller program (or algorithm) utilizing continuous adaptive digital to analog control may periodically monitor a process variable, such as temperature, pressure, flow rate, humidity, air quality, etc. to determine, and compensate for, the observed error between the monitored value and a target value (e.g., setpoint). Thus, continuous adaptive digital to analog control may monitor measureable conditions (e.g., process variables) within the system and may adjust one or more analog actuated devices to adjust a monitored condition toward a setpoint value. An analog actuated device may be adjusted based on converting the observed error into a digital pulse time value using timing characteristics for the actuated device and then converting the digital pulse time value into an analog control value for the actuated device. Over time, repeated adjustments to the analog actuated device may cause the monitored condition (e.g., process variable) to maintain a value at (or near) the target value.

As an example, continuous adaptive digital to analog control may be used to maintain air temperature within a computer data center. Thus, a control device implementing continuous adaptive digital to analog control may convert the difference between the current temperature and a target temperature into a digital pulse time value using a gain factor derived from an End Device Drive Time value for an analog actuated device controlling, at least partially, the temperature within the computer data center. Thus, continuous adaptive digital to analog control may control the analog device in order to bring the current temperature toward the target temperature, according to one example embodiment.

Additionally, continuous adaptive digital to analog control may continuously monitor system conditions (e.g., process variables) via measuring devices and repeatedly adjust analog actuated devices according to the changing values for the system conditions. Thus, over repeated adjustments, continuous adaptive digital to analog control may ensure that the system performs at or near the setpoint (e.g., within a certain tolerance).

By relying only upon a measured input (e.g., the current temperature), a setpoint (e.g., the target temperature), and timing information (e.g., the End Device Drive Time) for the controlled device, continuous adaptive digital to analog control may maintain control within a monitored system without requiring specific configuration or tuning during installation. All other calculations may be considered internal to the controller. Thus, continuous adaptive digital to analog control may, in some embodiments, be considered a "set and forget" control system that may increase rapid deployment of controls within mechanical control systems, such within computer room air handler (CRAH) or air handling unit (AHU) systems.

Please note, that while, for ease of discussion, the descriptions herein may refer to a monitored condition or process variable obtaining, achieving, or otherwise maintaining a target setpoint, in some embodiments, the process variable may never actually equal the setpoint, but may instead maintain a value within some tolerance (or deadband) range of nearness to the setpoint.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a logical block diagram illustrating one embodiment of continuous adaptive digital to analog control, as described herein. As noted above, continuous adaptive digital to analog control may include comparing a current process variable 120 to a setpoint value 130 to obtain an error value 140, according to the embodiment illustrated in FIG. 1. The process variable 120 may represent a monitored condition within a system (e.g., the current temperature, humidity, pressure, etc.) controlled, at least partially, by an analog actuated device and the error value 140 may represent the difference between the input value and the setpoint value (e.g., the difference between the current temperature and the target temperature).

In some embodiments, the setpoint value used during continuous adaptive digital to analog control may be configurable via any of various mechanisms. For example, in one embodiment controller 100 may be configured to present a user interface allowing adjustment to the setpoint. In another embodiment, controller 100 may be configured to obtain the setpoint value from a separate device providing a user interface, such as a thermostat for adjusting the air temperature within a computer data center.

Additionally, continuous adaptive digital to analog control may include converting the error value 140 into a digital pulse time value 150 using timing characteristics 145. The digital pulse time value 150 may represent a control correction to compensate for the observed error in the system. In other words, digital pulse time value 150 may represent an amount to change the current settings of the system in order to adjust the process variable toward the setpoint. Furthermore, continuous adaptive digital to analog control may include determining an analog output value 160 based on a previous output value 170 and the digital pulse time value 150. The analog output value 160 may then be converted to an analog control output 180 to drive an analog actuated device, as described in more detail below.

In some embodiments, the error value may be converted to the digital pulse time value using a gain factor derived from the actuated device's End Device Drive Time, (e.g., a maximum time for the device to cycle fully from a minimum state to a maximum state of performance). In some embodiments the analog output value 160 may be a percentage of a maximum control range for the analog actuated device. The controller may maintain the analog output value as an internal value representing an output control range (e.g., from 0-100), which may be adjusted based on the converted error value. The internal value may then be used to scale the analog control output. For example, if the internal value is 75, the controller may output an analog control value equal to 75% of the analog actuated device's full control range (e.g., the device's full voltage range).

Figure 2:
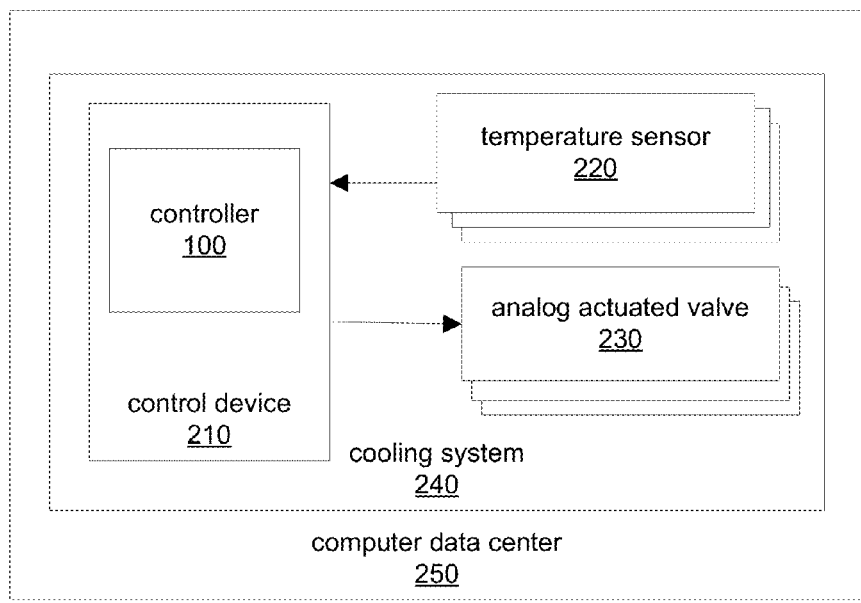
FIG. 2 is a block diagram illustrating one embodiment of a system implementing continuous adaptive digital to analog control, as described herein.

FIG. 2 is a block diagram illustrating one example embodiment of a system implementing continuous adaptive digital to analog control, as described herein. As shown in FIG. 2, a computer data center 250 may include a cooling system 240 to regulate the air temperature within the computer data center 250. Computer data center 250 may, in some embodiments, represent a facility to store multiple running computer systems that may generate excessive heat when operating and therefore may require a specialized cooling system in order to maintain the temperature in the computer data center within proper operating conditions. For example, in one embodiment cooling system 240 may include one or more air handling units (AHU) or computer room air handlers (CRAH).

According to the embodiment illustrated in FIG. 2, cooling system 240 may include one or more analog actuated valves 230 configured to adjust the temperature within the computer data center 250. For example, in one embodiment, analog actuated valve 230 may control the flow of chilled water through heat exchangers, thereby cooling the air within the computer data center 250. Additionally, cooling system 240 may also include one or more measuring devices, such as temperature sensor(s) 220 for monitoring the current temperature within the computer data center 250. Please note that in other embodiments, continuous adaptive digital to analog control may monitor and control any of various conditions, such as humidity, flow rate, and/or pressure within various types of systems and/or environments.

Furthermore, a controller program, such as controller 100, may be installed within a control device 210 that may be configured to communicate with one or more measuring devices and one or more analog actuated devices, such as with temperature sensor(s) 220 and analog actuated valve(s) 230, as illustrated in FIG. 2. For example, control device 210 may be configured with one or more input ports capable of receiving measurement information from one or more measuring devices and may also be configured with one or more output ports capable of sending control information to one or more analog actuated devices. Together, controller 100, control device 210, temperature sensor(s) 220 and analog actuated valve(s) 230 may be part of a mechanical control system installed to maintain the temperature within computer data center 250.

Please note that for ease of discussion, FIG. 2 shows a single controller and a single control device communicating with temperature sensor(s) 220 and analog actuated valve(s) 230, while in other embodiments, mechanical control systems configured to implement continuous adaptive digital to analog control may include multiple control devices and/or multiple controllers. Furthermore, controller 100 and control device 210 may monitor different types of sensors (e.g., temperature, pressure, humidity, flow rate, etc.) and control different types of analog actuated devices from those illustrated in FIG. 2 in order to adjust conditions within the monitored environment (e.g., a computer data center).

In one example embodiment, a measuring device, such as temperature sensor 220, may represent a digital or analog temperature thermometer configured to measure the current temperature within the system and communicate that temperature measurement to controller 100 (via control device 210) and controller 100 may be configured to output (via control device 210) an analog control value (e.g., a voltage) to analog actuated valve 230, thereby adjusting the temperature within computer data system 250, such as by controlling the amount of chilled water flowing through heat exchangers within the cooling system 240. Thus, controller 100 may be configured to monitor the current temperature (e.g., as process variable input 120) communicated by temperature sensor 220 and adjust analog actuated valve 230 to adjust the temperature toward a particular target temperature (e.g., setpoint).

As noted above, controller 100 may be configured to compare the current value for a process variable, such as the current temperature communicated by temperature sensor 220, to a setpoint value for the process variable to obtain an error value, according to one embodiment. Such an error value may represent the difference between a target setpoint and the current value for a particular monitored condition within the system (e.g., the difference between the current temperature and the desired temperature). Controller 100 may then use that error value to determine how much to adjust analog actuated valve 230 (e.g., how much to open the valve controlling the flow of chilled water).

In one embodiment, controller 100 may be configured to convert the error value into a digital pulse time value representing an amount of time for the analog actuated device to compensate for the difference between the current and target values for the process variable (e.g., the error value). For example, in one embodiment, the error value may be converted to a digital pulse time value based on a gain value determined based on timing characteristics for the analog actuated device (e.g., End Device Drive Time).

After converting the error value to a digital pulse time value, controller 100 may be configured to output an analog control value based the previous output value and the digital pulse time value. For example, in one embodiment, controller 100 may be configured to adjust a previous analog voltage by combining it with the digital pulse time value (e.g., the converted error value) in order to control analog actuated valve 130 at a certain performance level to compensate for the observed error in the monitored system.

In one embodiment, controller 100 may maintain an internal representation of the analog output value within the range of 0-100, representing a percentage of a total control range for driving the analog actuated device. For example, if analog actuated valve 230 accepts a voltage range of 0 to +12 v, an internally represented analog output value of 50 may correspond to (i.e., be scaled to) an actual analog voltage of +6 v, while an internally represented output value of 75 may correspond to an actual analog voltage of +9 v.

Figure 3:
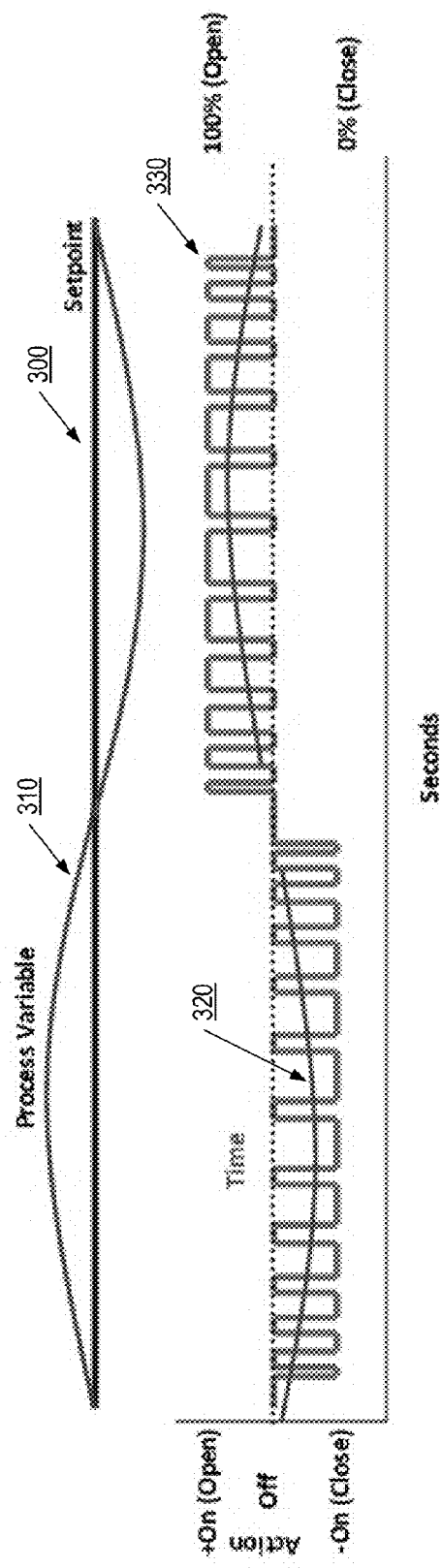
FIG. 3 is a logical waveform diagram illustrating one embodiment of continuous adaptive digital to analog control, as described herein.

FIG. 3 is a logical waveform diagram illustrating the effects of continuous adaptive digital to analog control, according to one embodiment. FIG. 3 includes two graphs, the upper one including setpoint 300 and process variable 310 through an example cycling of a system using continuous adaptive digital to analog control, according to one example embodiment. As shown in FIG. 3, with time increasing to the right, the process variable 310 oscillates around the setpoint 300. As with virtually all analog control systems, the process variable may oscillate around a setpoint and may never hold at a single point.

FIG. 3 also includes a lower graph, illustrating a comparison between device position 320 and an equivalent pulse train 330, as in one example embodiment. The example illustrated in FIG. 3 may represent the functioning of an analog actuated valve that is capable of moving from a fully closed state to a fully open state. In addition, a controller, such as controller 100, may be configured to drive the example system in FIG. 3, by applying an analog voltage between 0 and a maximum for the actuated device. In FIG. 3, the device position is represented by line 320, which may represent a percentage of the working range of the device being controlled. In some embodiments, the device position various based on the level of analog voltage output by controller 100 via control device 210 and according to continuous adaptive digital to analog control system. Thus, as the analog voltage varies (e.g., based on a digital pulse time value derived from the difference between the measured value of the process variable and the setpoint), the position of the device changes. For example, as the analog output varies, the position of a valve (e.g., how open the valve is) may change accordingly.

Please note that while line 320 in FIG. 3 is shown as a smooth curve, in some embodiments, the position of the device may not follow a smooth curve. Instead, in some embodiments, the position of the device may hold steady at one position for a time, and then move to another position for a time. According to some embodiments, the position of the controlled device may smoothly move between various positions, at which the device may hold for various amounts of time.

In the example embodiment illustrated in FIG. 3, the output from controller 100 may cycle first from a mid-range state down to a low state (representing a lower percentage of the control range (e.g., the voltage range) and then up through the mid-range to a high state (representing a higher percentage of the control range). The movement of the device position line 320 is compared to a pulse train 330 that represents a pulse wave for adjusting the actuated device. As is displayed in FIG. 3, the pulse width becomes wider as the analog output (and therefore device position line 320) moves further from the mid-range and represents either positive action (e.g., above the mid-range) or negative action (e.g., below the mid-range) depending upon the value of the analog output, according to one example embodiment. Additional, the movement of the process variable line 310 may also respond to the movement of the analog output (e.g., since the analog output is changing the state of the actuated device).

Thus, in one example embodiment, the analog conversion output may drive a valve controlling chilled water in a cooling system. As the process variable 310 (e.g., a temperature measurement of the system) drifts away the setpoint 300 (e.g., the desired target temperature), the analog output may change, opening or closing the valve a relative amount, as shown by device position line 320. The opening or closing of the valve then may cause the temperature of the example system to change and that change in temperature may be reflected in process variable 310, according to one embodiment.

Figure 4:
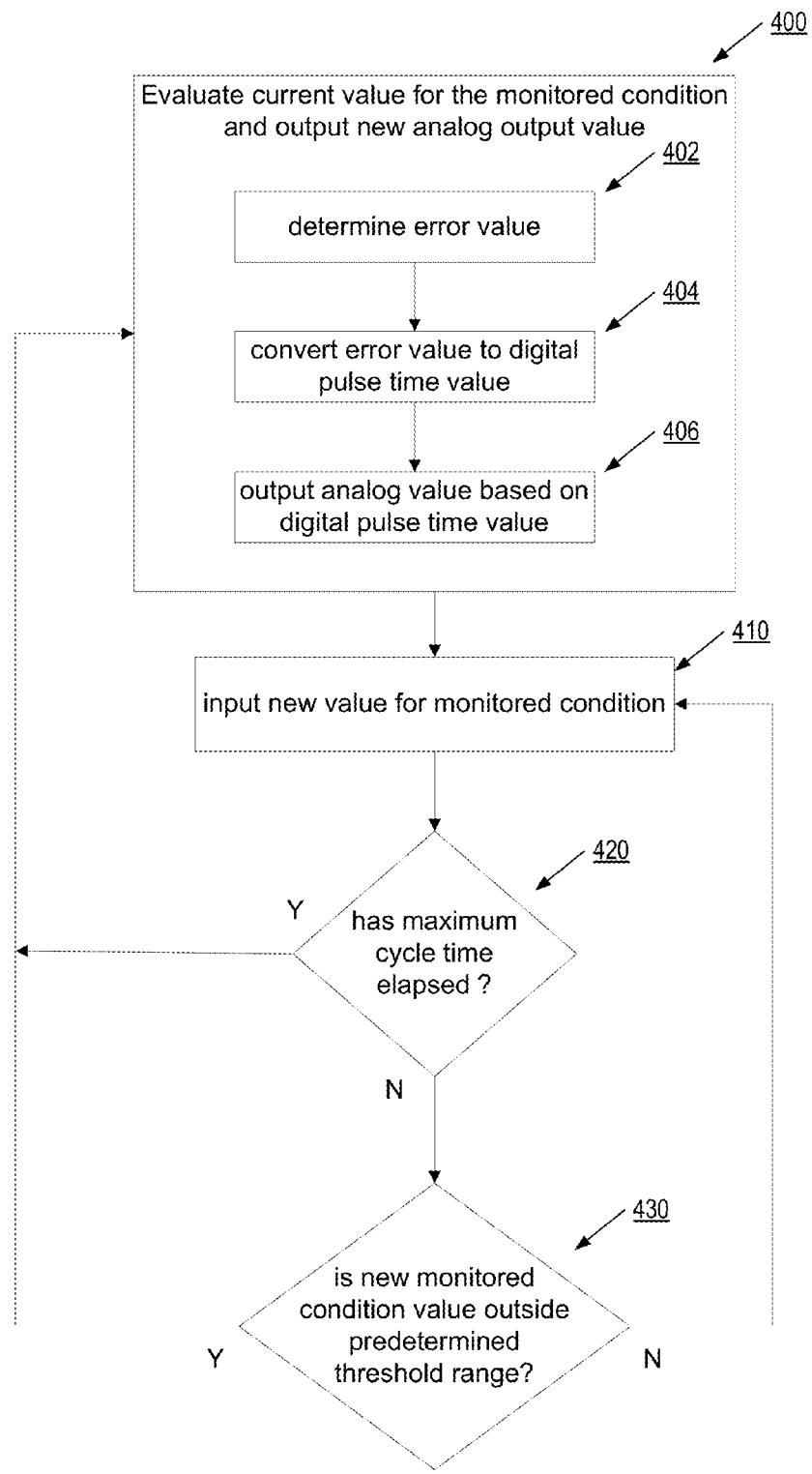
FIG. 4 is a flowchart illustrating one embodiment of method for determining when to adjust a device controlled using continuous adaptive digital to analog control, as described herein

As noted previously, controller 100 may continuously monitor one or more monitored conditions (e.g., process variables) and may repeatedly adjust one or more analog actuated devices to compensate for any observed error. FIG. 4 is a flowchart illustrating one embodiment of a method for determining when to make adjustments to the analog actuated device when utilizing continuous adaptive digital to analog control. For instance, as illustrated in block 400, controller 100 may evaluate a current value for a monitored condition and output a new analog output value. As described above, controller 100 may first determine an observed error value representing the difference between a current value for a monitored condition and a setpoint for the monitored condition, as shown in block 402, and may then convert that error value into a digital pulse time value, as shown in block 404. Additionally, controller 100 may output an analog value based, as least in part, on the digital pulse time value, as illustrated in block 406.

As shown in block 410 of FIG. 4, controller 100 may, according to some embodiments, then input a new value for the monitored condition, such as by reading the current temperature from temperature sensor 220 within cooling system 240. Controller 100 may utilize one or more mechanisms for determining when to next adjust the analog output. For example, as shown in block 420, controller 100 may utilize a maximum cycle time and adjust the output voltage to the analog actuated device (e.g., by determining a new analog output value) if the maximum cycle time has elapsed since the last time the analog output was adjusted, as illustrated by the positive output of block 420.

Additionally, in some embodiments, controller 100 may be configured to utilize a threshold or deadband range to determine when next to adjust the analog output value. For example, as shown in block 430, controller 100 may determine whether or not the new value for the monitored condition (e.g., process variable) is outside the threshold range and if so (as indicated by the positive output of block 430), controller 100 may determine and output a new analog output value. If the new value for the monitored condition is within the threshold range, controller 100 may not make an adjustment to the analog output, but may instead continue to monitor the condition as indicated by the negative output from block 430.

Controller 100 may be configured to use various mechanisms as threshold ranges according to different embodiments. For instance, in one embodiment, controller 100 may be configured to use a fixed value as a threshold range in some embodiments (e.g., 1 degree of temperature). In a different embodiment, controller 100 may be configured to use a threshold range corresponding to a percentage of an overall measurement range. In yet other embodiments, controller 100 may be configured to use a threshold range whose size is based on a configurable system variable.

In one embodiment, controller 100 may be configured to use a 5 second maximum cycle time and may further be configured to use a 1 degree threshold range. Thus, in such an example, controller 100 may determine whether or not 5 seconds have passed since the last time the monitored condition was evaluated and/or since the analog output was adjusted and whether the current temperature has changed by at least one degree. If either of these two conditions is met, controller 100 may then proceed to evaluate the current value of the monitored condition and possibly update the analog output, according to some embodiments.

Please note while FIG. 4 illustrates one embodiment in which both a maximum cycle time and a threshold range are used, in other embodiments only a maximum cycle time or only a threshold range may be used. Additionally, while FIG. 4 illustrated determining whether the maximum cycle time as elapsed prior to determining whether the current value for the monitored condition is outside the threshold range, in other embodiments these conditions may be checked in a different order. In yet other embodiments, additional or different mechanisms may be utilized to determine when to evaluate and possibly adjust the analog output as part of continuous adaptive digital to analog control.

Figure 5:
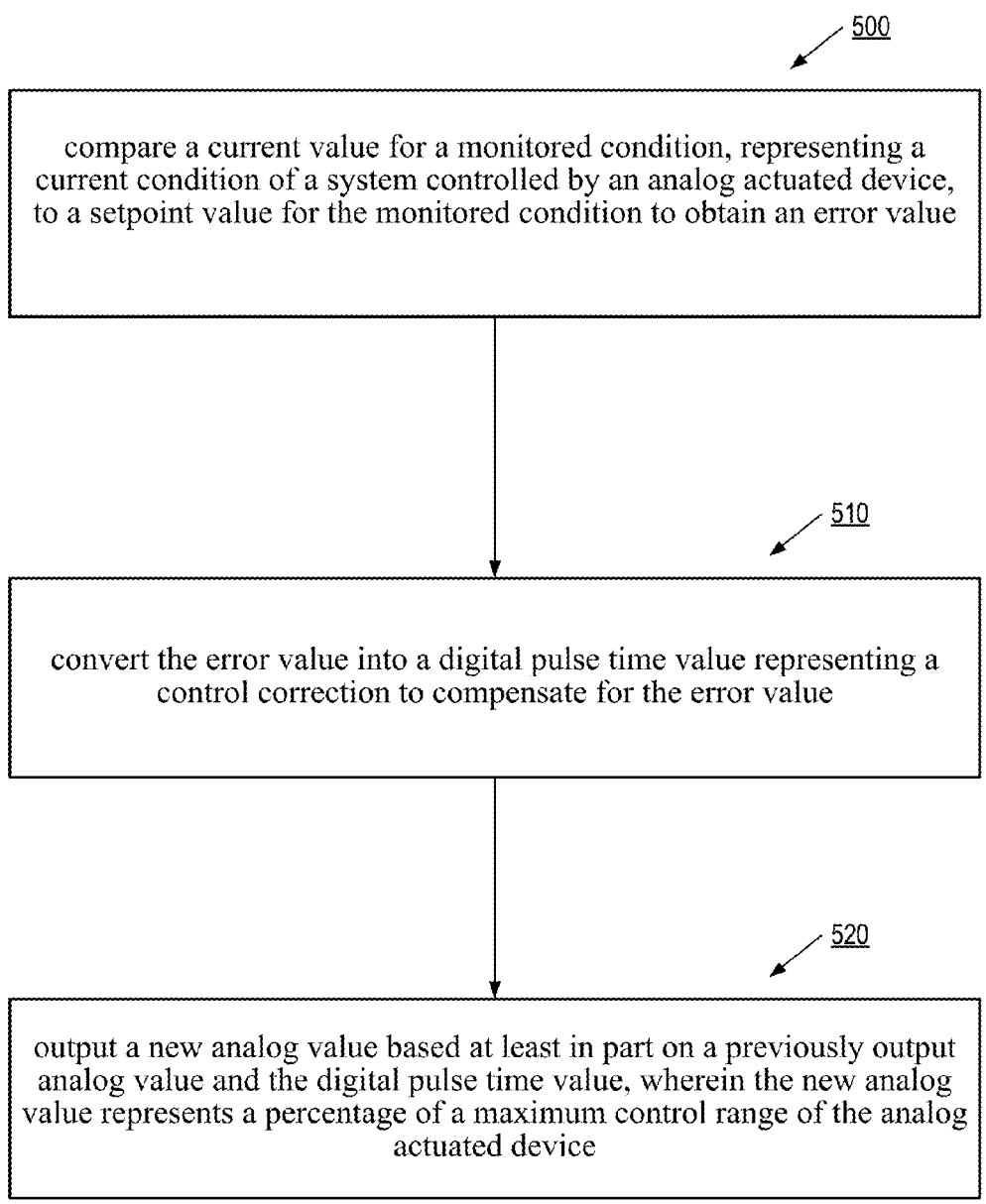
FIG. 5 is a flowchart illustrating one embodiment of a method for continuous adaptive digital to analog control, as described herein.

FIG. 5 is a flowchart illustrating one embodiment of a method for calculating an analog value within continuous adaptive digital to analog control, as described herein. As illustrated in block 500 and described above, controller 100 may be configured to compare a current value for a monitored condition (e.g., process variable) to a setpoint value for the monitored condition to obtain an error value, according to one embodiment. For example, in one embodiment, controller 100 may be configured to monitor the current air temperature (such as in computer data system 250) and use the difference between the current temperature and a target temperature as the error value.

As shown in block 510, controller 100 may further be configured to convert the error value into a digital pulse time value representing a control correction for the analog actuated device to compensate for the error value, according to one embodiment. In some embodiments, the error value may be converting using a gain factor derived from timing characteristics for the analog actuated device. For example, in one embodiment, the error value may be multiplied by a gain factor derived by dividing 100 by the device's End Device Drive Time. Thus, the conversion of the error value may result in a time-based adjustment value, such as a digital pulse time value (e.g., since the gain factor may be based on the timing characteristics of the actuated device), according to some embodiments.

Controller 100 may also be configured to output a new analog value based in part on a previously output analog value and the digital pulse time value, as shown in block 520. For instance, controller 100 may adjust the previously output analog value based on the digital pulse time value. The new analog value may represent a percentage of a maximum control range for the analog actuated device, as also shown in block 520.

For example, controller 100 may be configured to internally represent the actual analog output voltage as a number within an output control range, thus representing a percentage of the full control range of the analog actuated device. This internal representation may then be used to scale an actual analog voltage to the corresponding percentage of the device's voltage range. For example, if analog actuated valve 230 accepts a voltage range of 0 to +12 v, an internally represented output value of 50 may correspond to (i.e., be scaled to) an actual analog voltage of +6 v (e.g., 50% of the full voltage range), while an internally represented output value of 75 may correspond to an actual analog voltage of +9 v. Please note while the discussion above refers to maintaining an internal representation within the range of 0-100, in other embodiments, other internal representations may be maintained and scaled accordingly. For instance, in one embodiment, an internal representation may be maintained within the range of 0-50, while in another embodiment, an internal representation may correspond to a range of 100 times the maximum control range of the actuated device (e.g., 0-1200 in the example above).

Figure 6:
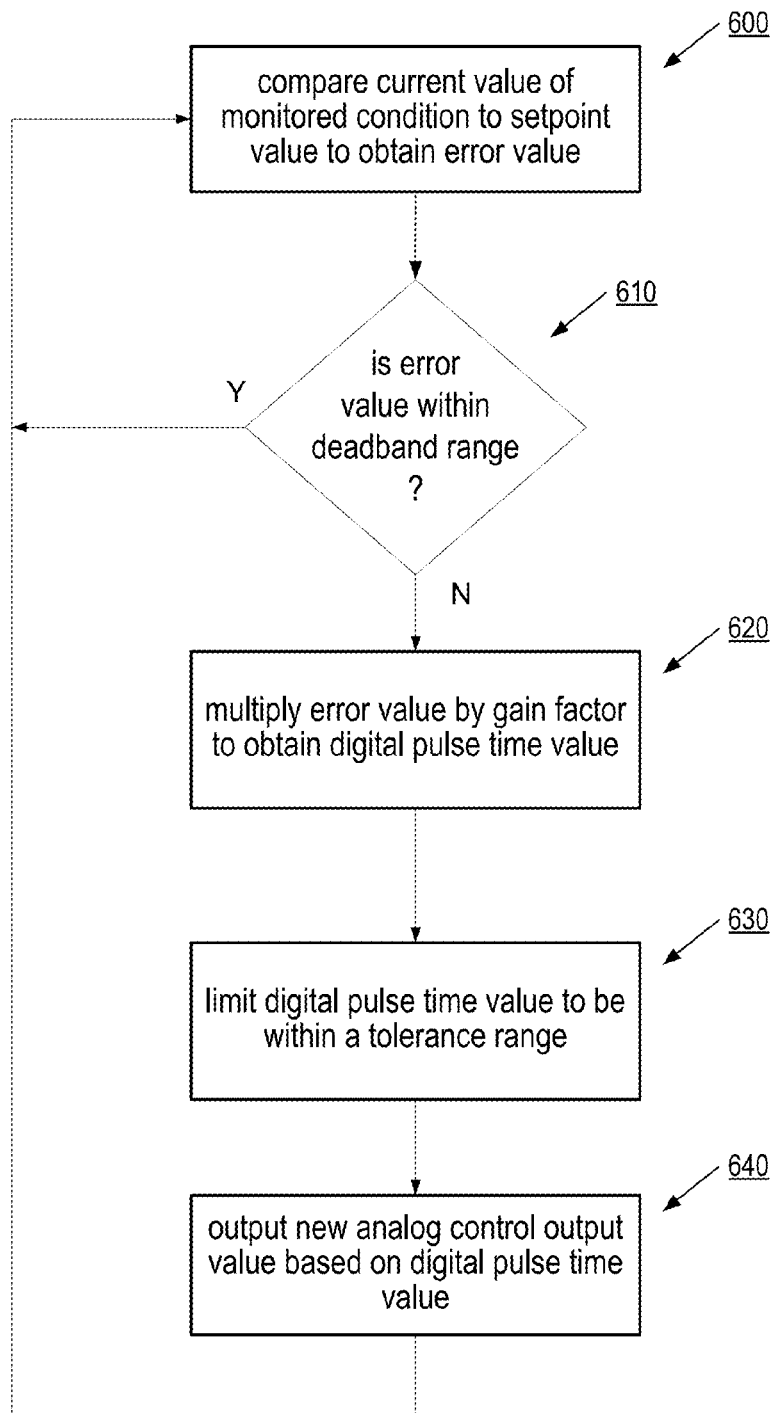
FIG. 6 is a flowchart illustrating one embodiment of a method for determining an output value in continuous adaptive digital to analog control, as described herein.

FIG. 6 is a flowchart illustrating one embodiment of a method for determining a new analog output value when implementing continuous adaptive digital to analog control, as described herein. As shown in block 600, controller 100 may compare a current value for a monitored condition (e.g., process variable) to a setpoint value to obtain an error value, described above. In some embodiments, controller 100 may be configured to only make adjustments to the system if the current value differs from the setpoint by more than a certain amount. In other words, controller 100 may be configured to control the system to within a deadband (or tolerance) range rather than trying to maintain the current temperature at an exact target temperature. Thus, as shown in block 610, controller 100 may be configured to determine whether the calculated error value is within a deadband (or tolerance) range.

For example, in one example embodiment, controller 100 may be configured to maintain the temperature within computer data system 250 to within a deadband range of a setpoint temperature (e.g., in terms of a number of degrees). In other words, controller 100 may use a deadband range of 5 degrees (e.g., within 2.5 degrees above or below the target temperature). While in some embodiments, controller 100 may utilize a deadband range specified in terms of an absolute value (e.g., 5 degrees Fahrenheit), in other embodiments, controller 100 may be configured to use a deadband range specified as a percentage of the overall measurement range (e.g., 1% of the overall temperature range). In yet other embodiments, controller 100 may be configured to use an adjustable or modifiable deadband range. For example, in one embodiment, controller 100 may be configured to allow a user (such as a technician or system manager) to set/modify the deadband range used as part of continuous adaptive digital to analog control. In another embodiment, controller 100 may be configured receive information from another device or computer (such as via a control network) specifying or modifying the deadband range.

Please note while described herein regarding temperature and temperature ranges, continuous adaptive digital to analog control may be used to monitor and control conditions other than temperature, such as pressure, flow rate, humidity, etc., according to various embodiments. Thus, a deadband range may be specified in terms other than degrees of temperature (e.g., pounds per square inch, parts per million, cubic feet per second, etc.).

If, as indicated by the negative output of block 610, the error value is not within the deadband range, controller 100 may then convert the error value to a digital pulse time value, as shown in blocks 620 and 630. For instance, in some embodiments, the digital pulse time value may be determined, at least in part, by multiplying the error value by a gain factor, as shown in block 620. For example, in one example embodiment, the gain factor may be determined by dividing 100 by the analog actuated device's End Device Drive Time. In other embodiments, however, gain factors may be determined and used in different ways.

Controller 100 may be configured to use different gain factors in different embodiments and the individual gain factors may or may not be configurable after installation (e.g., system setup) according to various embodiments. In some embodiments the method of determining the gain factor (e.g., dividing 100 by the End Device Drive Time) may not be configurable after installation, but during system installation a particular End Device Drive Time corresponding to the analog actuated device being controlled may be specified. (e.g., either by an installer or automatically via an intelligent device). Additionally, the End Device Drive Time may be specified in different manners, according to different embodiments. For instance, in one embodiment, an installer may manually specify End Device Drive Times for the actuated device(s) being installed, while in another embodiment, End Device Drive Times may be received by controller 100 from another device or computer (e.g., an intelligent actuated device, or a computer configured to discover and/or specify information about the installed devices during system installation).

As shown in block 630, controller 100 may be configured to limit the calculated digital pulse time value to ensure that it is within a tolerance range, such as to utilize smaller rather than larger system adjustments, according to some embodiments. For example, below is a snippet of source code (written in a generic, universal programming language) that demonstrates one possible example embodiment of converting an error value to a digital pulse time value using a gain factor and an overall digital pulse time value tolerance range. In one embodiment, a digital pulse time value tolerance range may be specified in terms of a number of seconds (e.g., 5 seconds), while in other embodiments, a digital pulse time value tolerance range may be specified in other manners, such as a percentage of a valve's End Device Drive Time. In general, a tolerance range for a digital pulse time value may be specified in various ways according to different embodiments.

The example source code below represents a function that takes as input the target value for a process variable (e.g., Setpoint), the current value of the process variable (e.g., ProcessInput), a deadband value (e.g., Db), the gain factor (e.g., Kp) and a tolerance range (e.g., TLimit1) for the resulting digital pulse time value. In the example function below, the deadband value is used as a tolerance range for the current value of the monitored condition (e.g., the process variable). For instance, rather than trying to maintain an exact temperature, a controller may be configured to allow a certain amount of tolerance (e.g., 0.5 degrees) around the setpoint value.

```
Arg 1 Setpoint
Arg 2 ProcessInput
Arg 3 Db
Arg 4 Kp
Arg 5 TLimit1
Numeric PulseValue, Err
Err=(ProcessInput−Setpoint)
If abs(Err)>=Db then
    PulseValue=maximum(minimum((Err*Kp), TLimit1),
        −TLimit1)
Else
    PulseValue=0
Endif
Return PulseValue
```

As shown in the example source code above, the error value for the process variable is determined by subtracting the target value (Setpoint) from the current value (ProcessInput)

and stored in a local variable (Err). The error value is then compared to the deadband value (Db) to see if the current error is large enough to trigger an adjustment. If so, then a digital pulse time value is calculated based on multiplying the error value by the gain factor (e.g., Err*Kp) and ensure that the resulting digital pulse time value is within the tolerance range (TLimit1). If the current error is within the deadband value, then a digital pulse time value of 0 is used. The particular deadband value used may vary from embodiment to embodiment. For example, in some embodiments, an absolute value (e.g., 0.5) may be used as a deadband value, while in other embodiments a deadband value representing a certain percentage (e.g., of the process variable) may be used.

Please note that the specific values used as a tolerance range for the digital pulse time value may vary from embodiment to embodiment and may or may not be configurable, according to various embodiments. Furthermore, while the above example source code uses particular variable names and methods for converting the error value to a digital pulse time value, in other embodiments, different method, functions and variables may be used. For example, some embodiments may not use minimum and maximum functions to ensure that the digital pulse time value is within a particular tolerance limit. Furthermore, in some embodiments, the statements, functions, and calculations in the above example source code may be grouped within different functions or methods.

Returning now to FIG. 6, controller 100 may, as illustrated by block 640, output a new analog output value based on the digital pulse time value, according to one embodiment, as will be described below regarding FIG. 7.

Figure 7:
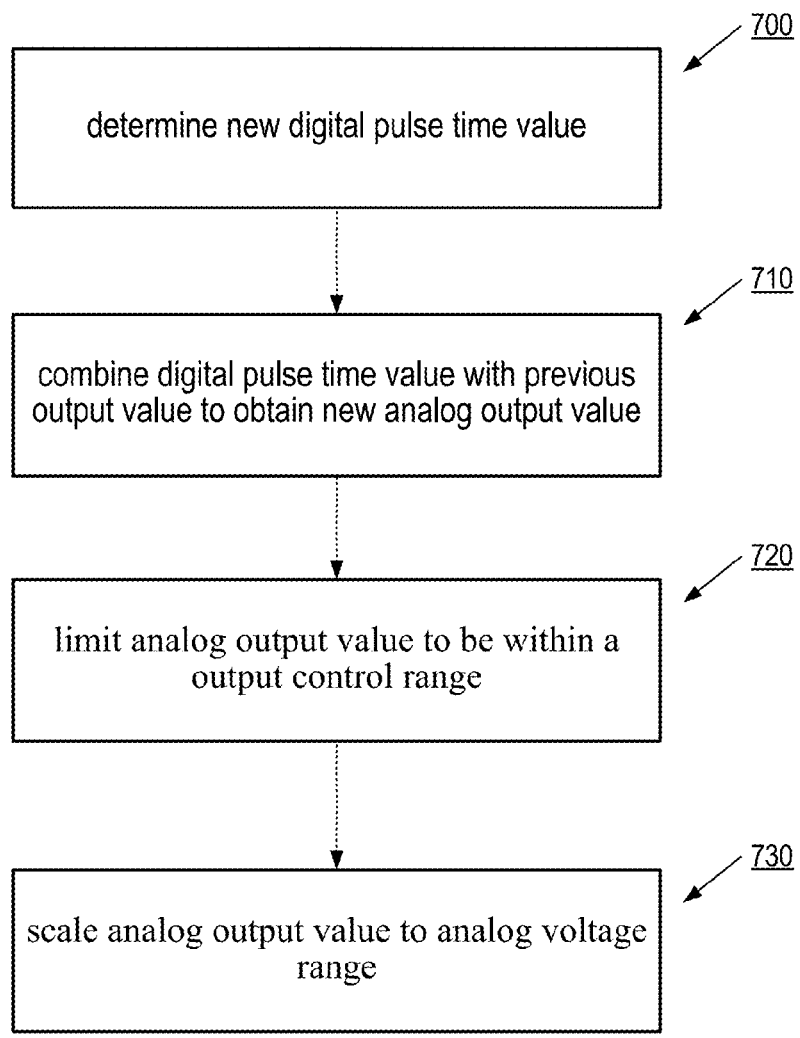
FIG. 7 is a flowchart illustrating one embodiment of a method for utilizing scaling limits within continuous adaptive digital to analog control, as described herein.

FIG. 7 is a flowchart illustrating one embodiment of a method for determining a new analog output value from a digital pulse time value. As shown in block 700, controller 100 may be configured to determine a new digital pulse time value, as described previously. Controller 100 may also be configured to combine the digital pulse time value to the previous output value to obtain a new analog output value, as shown in block 710. For example, in one embodiment, controller 100 may be configured to add the new digital pulse time value to the previous output value to obtain the new analog output value. In other embodiments, however, the digital pulse time value and previous output value may be combined in other ways (e.g., scaling may be applied, etc.).

Furthermore, a limit range may be applied to the new analog output value, according to some embodiments. For example, as shown in block 720, the analog output value may be limited to an output control range. For example, in one embodiment controller 100 may be configured to use an output control range of 0-100, (e.g., 100 may be used instead of any value over 100 and 0 may be used instead of any value under 0). In some embodiments, using an output control range of 0-100 may allow controller 100 to more easily use the analog output value as a percentage of a total control range for the output.

Additionally, the analog output value may be scaled according to the analog control range of the analog actuated device, as shown in block 730. For example, in one example embodiment, controller 100 may be configured to drive an analog actuated device using a voltage range from 0 to 12 volts. In such an example embodiment, controller 100 may scale an output value of 50 to obtain an analog output voltage of 6 volts (e.g., 50% of 12 volts).

Below are two snippets of example source code representing one embodiment of the flowchart illustrated in FIG. 7. The first snippet initializes various values used within the example source code:

ConvertSignal=50
DAMPER=0 'stops/initializes damper
Kp=(100/VLV_MAX) 'gain factor
Deadband=0.5
Limit=5 'seconds
PVCapture=PV In the example initialization code above, ConvertSignal is used to store an internal representation of the analog output value, DAMPER is used to store the digital pulse time value, Kp stores the gain factor, Deadband stores a tolerance limit for the error value, Limit stores a value used to limit the size of the digital pulse time value, while PVCapture stores the current value for the process variable (from PV), according to one example embodiment.

As shown below, according to one embodiment, a call to PMWtoAnalogFunction returns a digital pulse time value (e.g., stored in DAMPER). One example of how the PMWtoAnalogFunction may convert the error value to a digital pulse time value was described above in regards to FIG. 6. The example code below then combines a previously stored Convertsignal with the digital pulse time value (e.g., Convertsignal+DAMPER) and then ensures that Convertsignal is within the range 0-100 before storing the new Convertsignal to PMWanalog for scaling and output as an analog voltage.

DAMPER=PMWtoAnalogFunction(SETPT, PV, Deadband, Kp, Limit)
Set ConvertSignal=Convertsignal+DAMPER
if ConvertSignal<0 then set ConvertSignal=0
if ConvertSignal>=100 then set ConvertSignal=100
Set PMWanalog=ConvertSignal Please note that, as with all the example source code discussed herein, the above snippets represent one example embodiment using particular functions, methods and variables, and other embodiments may use different methods, functions and variables.

Various control parameters (or configuration values) used as part of continuous adaptive digital to analog control, (such as End Device Drive Times, deadband threshold ranges, process variable threshold ranges, digital pulse time value limits, maximum cycle time limits, etc.) may not be adjustable during controller execution, in some embodiments. Furthermore, some of the control parameters may be setup prior to installation and others may be setup at/during installation, according to various embodiments.

For instance, in one embodiment, only the process variable setpoint may be setup at installation time, while all other configuration values may be setup prior to installation and may not be modifiable after installation and may not change from installation to installation. In yet other embodiments, however, the End Device Drive Times for controlled devices (e.g., analog actuated valve 230) may also be specified at/during installation (e.g., to match the specific devices being installed). Thus, in some embodiments, continuous adaptive digital to analog control may be considered a self-adjusting control loop (e.g., in contrasting to traditional PID control loops that require "tuning").

Figure 8:
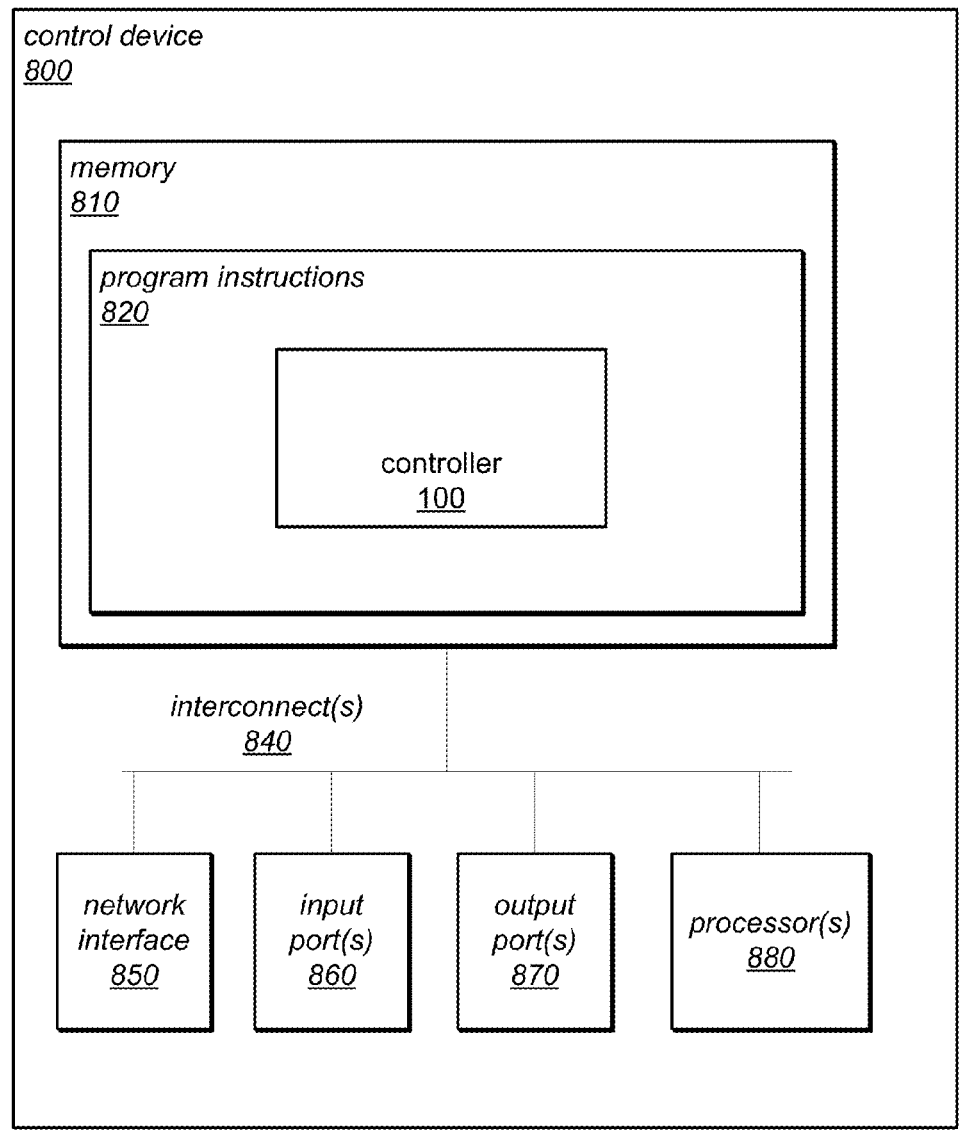
FIG. 8 is a logical block diagram illustrating an example system configured to implement continuous adaptive digital to analog control, as described herein.

The techniques described herein for continuous adaptive digital to analog control may be implemented in any of a wide variety of computing systems. FIG. 8 illustrates an example computing device that is configured to implement continuous adaptive digital to analog control, as described herein and according to various embodiments. A control device 800 (such as control device 210) may be any of various types of devices, including, but not limited to, a programmable logic controller, programmable logic array, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In some embodiments, the methods described herein may be implemented by a computer program product, or software. In some embodiments a non-transitory, computer-readable storage medium may have stored thereon instructions which may be used to program a control device (or other computer systems or electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A control device 800 may include a processor unit 880 (possibly including multiple processors, a single-threaded processor, a multi-threaded processor, a multi-core processor, etc.) which may be configured to execute one or more modules or applications configured to implement continuous adaptive digital to analog control, such as controller 100, which may be present within program instructions 820 stored in memory 810 of the same control device 800 or may be present within program instructions stored within a memory of another computer system similar to or different from control device 800.

The control device 800 may include one or more system memories 810 (e.g., one or more of cache, SRAM DRAM, RDRAM, EDO RAM, DDR RAM, SDRAM, Rambus RAM, EEPROM, etc.), a system interconnect 840 (e.g., LDT, PCI, ISA, etc.), a network interface 850 (e.g., a FieldBUS interface, a Controller Area Network (CAN bus) interface, a ControlNet interface, a DirectNet interface, a DeviceNet interface, an ATM interface, an Ethernet interface, a Frame Relay interface, etc.), one or more input ports 860 and output ports 870. According to various embodiments, input ports 860 and output ports 870 may be any of various types of interfaces capable of inputting and/or outputting digital or analog signals. For example, input ports 860 may connect to various sensors or other measuring devices, such as to measure temperature, humidity, pressure and/or flow rate (among others). Similarly output ports 870 may connect to any of various controlled devices utilizing any of various control signals, such as analog voltage among others. The memory medium may include other types of memory as well, or combinations thereof. In other embodiments, control device 800 may include more, fewer, or different components than those illustrated in FIG. 8 (e.g., video cards, audio cards, additional network interfaces, peripheral devices, user input devices, etc.). The processor(s) 880, the network interface 850, input ports 860, output ports 870 and the system memory 810 may be coupled to the system interconnect 840.

One or more of the system memories 810 may include program instructions 820 configured to implement some or all of the techniques described herein for continuous adaptive digital to analog control (according to any of the embodiments described herein). For example, one or more of the system memories 810 may include code to implement and/or execute controller 100, according to one embodiment.

In various embodiments, controller 100, and/or individual sub-modules of controller 100 may each be implemented in any of various programming languages or methods. For example, in one embodiment, controller 100 may be written in any of the C, C++, assembly, JAVA or other general purpose programing languages, while in another embodiment, it may be written using a different, more specialized, programming language. Moreover, in some embodiments, controller 100 and/or various sub-modules thereof may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
an analog actuated device configured to control a monitored condition of a system;
a measuring device configured to measure values for the monitored condition of the system; and
a control device coupled to the analog actuated device and the measuring device, wherein the control device is configured to:
repeatedly adjust the analog actuated device based on the monitored condition and a setpoint value, wherein to adjust the analog actuated device the control device is further configured to:
receive a current value for the monitored condition from the measuring device;
compare the current value with the setpoint value for the monitored condition to obtain an error value;
convert the error value into a digital pulse time value representing a control correction for the analog actuated device to compensate for the error value; and output, to the analog actuated device, an analog voltage value based at least in part on a previously output voltage value and the digital pulse time value.

2. The system of claim 1, wherein the analog actuated device is part of a cooling system controlling an air temperature as the monitored condition in a controlled environment of the system, wherein the analog actuated device at least partially controls the air temperature based on the analog voltage value output by the control device to the analog actuated device.

3. The system of claim 2, wherein the controlled environment comprises a computer data center and wherein the air temperature corresponds to an air temperature within the computer data center.

4. The system of claim 1, wherein the control device is further configured to perform said converting and said outputting in response to determining that the error value is not within a deadband threshold range.

5. A method, comprising:
performing, by a control device:
monitoring a condition of a system controlled by an analog actuated device; and
adjusting a performance state of the analog actuated device based on said monitoring;
wherein said monitoring comprises comparing a current value for the monitored condition to a setpoint value for the monitored condition to obtain an error value; and
wherein said adjusting comprises:
converting the error value into a digital pulse time value, representing a control correction for the analog actuated device to compensate for the error value; and
determining a new control value for the analog actuated device based, at least in part, on the digital pulse time value.

6. The method of claim 5, wherein said converting the error value into the digital pulse time value comprises adjusting the error value by a gain factor derived, at least in part, from an end device drive time corresponding to a time required for the analog actuated device to cycle from a minimum state to a maximum state of performance.

7. The method of claim 5, wherein said converting the error value into a digital pulse time value comprises limiting the digital pulse time value to a maximum tolerance range.

8. The method of claim 5, wherein said determining a new control value comprises adding the digital pulse time value as a change to a previous control value.

9. The method of claim 5, further comprising repeating said adjusting at the earlier of:
determining that a difference between the current value for the monitored condition and a previous value for the monitored condition is outside of a deadband threshold range; or
determining that a maximum cycle time has elapsed since a last performance of said adjusting.

10. The method of claim 5, wherein the monitored condition corresponds to an air temperature within a controlled environment, wherein the analog actuated device comprises a valve controlling an amount of chilled water flowing through heat exchangers controlling the air temperature within the controlled environment, and wherein the amount of chilled water flowing through the valve corresponds to the new control value for the analog actuated device.

11. The method of claim 5, further comprising:
receiving input modifying the setpoint value for the monitored condition; and
repeating said monitoring and said adjusting using the modified setpoint value.

12. The method of claim 5, further comprising performing said adjusting in response to determining that the error value is outside a deadband range.

13. The method of claim 12, wherein the deadband range corresponds to a percentage of an overall measurement range.

14. The method of claim 12, further comprising:
receiving input modifying the deadband range; and
repeating said monitoring and said adjusting using the modified deadband range.

15. The method of claim 5, further comprising installing the control device to perform said monitoring and said adjusting without tuning any control parameters for said adjusting.

16. A non-transitory, computer-readable storage medium storing program instructions that when executed on a control device cause the control device to perform:
determining a digital pulse time value based at least in part on timing characteristics of an analog actuated device and on a current value for a monitored condition controlled, at least in part, by the analog actuated device;
converting the digital pulse time value into an analog signal for driving the analog actuated device to adjust the monitored condition toward a setpoint value for the monitored condition; and
repeating said determining and said converting to continue to adjust the monitored condition toward the setpoint value.

17. The medium of claim 16, wherein said determining a digital pulse time value comprises:
determining an error value based on a comparison between the current value for the monitored condition and the setpoint value for the monitored condition;
adjusting the error value by a gain value derived from the timing characteristics of the analog actuated device; and
determining the digital pulse time value based, at least in part, on the adjusted error value.

18. The medium of claim 16, wherein the timing characteristics of the analog actuated device comprise an end device drive time corresponding to a time required for the analog actuated device to cycle from a minimum state to a maximum state of performance.

19. The medium of claim 16, wherein said converting the digital pulse time value into an analog signal comprises adding the digital pulse time value, as a percentage of a maximum control range for the analog actuated device, to a previously output analog signal.

20. The medium of claim 19, wherein the program instructions further cause the control device to perform:
maintaining an internal representation of the analog signal, wherein the internal representation corresponds to the previously output analog signal as a percentage of the maximum control range for the analog actuated device, and wherein said adding the digital time value to the previously output analog signal comprises:
adding the digital pulse time value to the internal representation; and
scaling the internal representation according to the maximum control range to obtain the analog signal.

* * * * *